US012561751B2

(12) United States Patent
Hwang

(10) Patent No.: US 12,561,751 B2
(45) Date of Patent: Feb. 24, 2026

(54) DIGITAL COPYRIGHT CREATION MODULE FOR DIGITAL CONTENT CREATED USING GENERATIVE AI, AND DIGITAL CONTENT DISTRIBUTION APPARATUS AND METHOD USING THE SAME

(71) Applicant: aisolute.Co., Ltd, Gyeonggi-do (KR)

(72) Inventor: Yong Hun Hwang, Gyeonggi-do (KR)

(73) Assignee: AISOLUTE.CO., LTD, Gyeonggi-Do (KR)

( * ) Notice: Subject to any disclaimer, the term of this patent is extended or adjusted under 35 U.S.C. 154(b) by 0 days.

(21) Appl. No.: 18/829,786

(22) Filed: Sep. 10, 2024

(65) Prior Publication Data

US 2025/0095090 A1     Mar. 20, 2025

(51) Int. Cl.
G06Q 50/18 (2012.01)

(52) U.S. Cl.
CPC ....... G06Q 50/184 (2013.01); G06Q 2220/00 (2013.01)

(58) Field of Classification Search
CPC .......................... G06Q 50/184; G06Q 2220/00
USPC ........................................................ 705/310
See application file for complete search history.

(56) References Cited

U.S. PATENT DOCUMENTS

| | | | | |
|---|---|---|---|---|
| 6,754,642 | B2 * | 6/2004 | Tadayon ............. | G06Q 20/1235 705/54 |
| 6,876,984 | B2 * | 4/2005 | Tadayon ................. | H04L 65/60 713/182 |
| 7,627,892 | B2 * | 12/2009 | Lin ..................... | G06Q 20/3821 705/52 |
| 11,244,032 | B1 * | 2/2022 | Nguyen .................. | G06F 9/547 |
| 12,469,042 | B1 * | 11/2025 | Danilchenko ...... | G06Q 30/0207 |
| 2005/0021398 | A1 * | 1/2005 | McCleskey ............. | H04L 67/02 705/14.69 |
| 2005/0038707 | A1 * | 2/2005 | Roever ................ | G06Q 20/202 705/21 |
| 2005/0071280 | A1 * | 3/2005 | Irwin .................... | G06F 21/105 705/59 |
| 2006/0143690 | A1 * | 6/2006 | Lin ....................... | G06Q 20/202 726/2 |
| 2009/0013185 | A1 * | 1/2009 | Lim ........................ | G06F 21/10 713/170 |
| 2010/0241871 | A1 * | 9/2010 | Raley ................. | H04N 21/8355 726/28 |

(Continued)

FOREIGN PATENT DOCUMENTS

| | | | | | |
|---|---|---|---|---|---|
| KR | 20080044598 | A | * | 5/2008 | ........... G06F 21/105 |
| KR | 20210154786 | A | * | 12/2021 | ......... G06Q 30/0207 |

(Continued)

OTHER PUBLICATIONS

KR office action; dated May 9, 2025; 9 pages. Not Translated.

*Primary Examiner* — Michael Tomaszewski
(74) *Attorney, Agent, or Firm* — CANTOR COLBURN LLP

(57)     ABSTRACT

The present invention relates to a digital copyright creation module that creates a digital copyright of digital content created using generative AI, and a digital content distribution apparatus and method using the same, and the digital content distribution apparatus includes a digital content creation management unit; and a digital content distribution management unit.

14 Claims, 10 Drawing Sheets

(56) References Cited

U.S. PATENT DOCUMENTS

| | | | | |
|---|---|---|---|---|
| 2011/0125649 | A1* | 5/2011 | Kukita | G06Q 50/184 |
| | | | | 705/310 |
| 2014/0289515 | A1* | 9/2014 | Sorotokin | H04L 63/08 |
| | | | | 713/176 |
| 2016/0321437 | A1* | 11/2016 | Kimmell | G06F 21/1012 |
| 2020/0273048 | A1* | 8/2020 | Andon | G06Q 10/02 |
| 2020/0372137 | A1* | 11/2020 | Li | G06F 21/16 |
| 2020/0372835 | A1* | 11/2020 | Li | G06F 21/16 |
| 2022/0309540 | A1* | 9/2022 | Blaikie, III | G06Q 30/0255 |
| 2022/0309541 | A1* | 9/2022 | Blaikie, III | G06Q 30/0269 |
| 2022/0309542 | A1* | 9/2022 | Blaikie, III | G06Q 30/0261 |
| 2022/0318852 | A1* | 10/2022 | Blaikie, III | G06Q 30/0255 |
| 2022/0318853 | A1* | 10/2022 | Blaikie, III | G06Q 30/0255 |
| 2022/0318938 | A1* | 10/2022 | Ogawa | G06Q 50/184 |
| 2022/0358450 | A1* | 11/2022 | Stephens | A63F 13/79 |
| 2023/0038412 | A1* | 2/2023 | Howell | G11B 27/34 |
| 2023/0107705 | A1* | 4/2023 | Eivy | G06Q 20/36 |
| | | | | 705/71 |
| 2023/0117725 | A1* | 4/2023 | Quigley | G06Q 20/326 |
| | | | | 705/65 |
| 2023/0118717 | A1* | 4/2023 | Quigley | G06Q 20/40 |
| | | | | 705/65 |
| 2023/0206216 | A1* | 6/2023 | Lehmann | G06F 21/645 |
| 2023/0267476 | A1* | 8/2023 | Kim | G06F 21/64 |
| | | | | 705/39 |
| 2023/0289776 | A1* | 9/2023 | Kannaiyan | G06Q 30/0621 |
| 2024/0185191 | A1* | 6/2024 | Bernardi | H04L 9/50 |
| 2024/0193204 | A1* | 6/2024 | Kuhn | G06N 3/0475 |
| 2025/0095090 | A1* | 3/2025 | Hwang | G06Q 50/184 |

FOREIGN PATENT DOCUMENTS

| | | | | | |
|---|---|---|---|---|---|
| KR | 20220020844 | A * | 2/2022 | | H04L 9/50 |
| KR | 102551872 | B1 | 6/2023 | | |
| KR | 102551004 | B1 | 7/2023 | | |
| KR | 102570178 | B1 | 8/2023 | | |
| WO | WO-2006006780 | A1 * | 1/2006 | | G06Q 20/12 |

* cited by examiner

FIG. 6

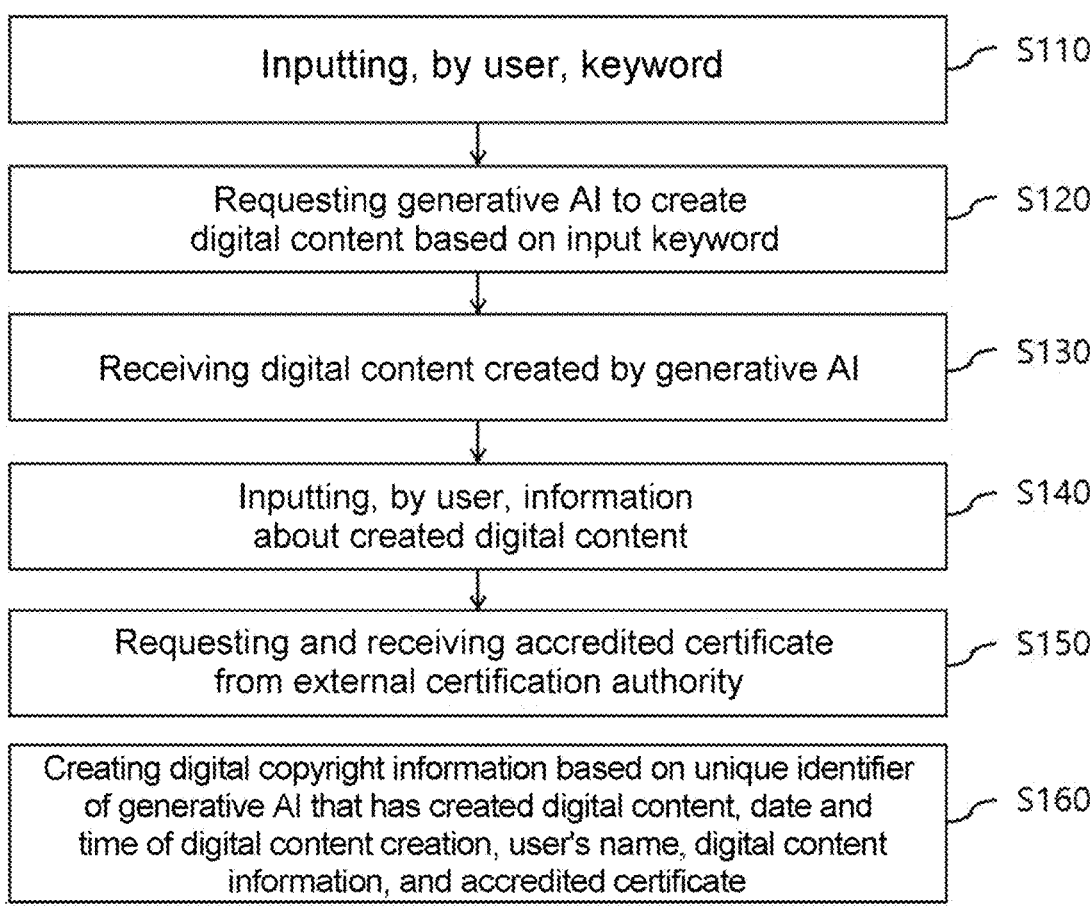

Inputting, by user, keyword — S110

Requesting generative AI to create
digital content based on input keyword — S120

Receiving digital content created by generative AI — S130

Inputting, by user, information
about created digital content — S140

Requesting and receiving accredited certificate
from external certification authority — S150

Creating digital copyright information based on unique identifier
of generative AI that has created digital content, date and
time of digital content creation, user's name, digital content
information, and accredited certificate — S160

FIG. 7

DIGITAL COPYRIGHT CREATION MODULE FOR DIGITAL CONTENT CREATED USING GENERATIVE AI, AND DIGITAL CONTENT DISTRIBUTION APPARATUS AND METHOD USING THE SAME

CROSS-REFERENCE TO RELATED PATENT APPLICATION

This application claims the benefit of Korean Patent Application No. 10-2023-0124193, filed on Sep. 18, 2023, in the Korean Intellectual Property Office, the disclosure of which is incorporated herein in its entirety by reference.

BACKGROUND OF THE INVENTION

1. Field of the Invention

The present invention relates to a digital content distribution apparatus and method that can create digital content using generative AI, create a digital copyright of the created digital content, and distribute the digital content using the same.

2. Description of the Related Art

Recently, there has been an explosive increase in digital content across various fields. Therefore, various apparatuses and methods for distributing this digital content are being developed. Moreover, with the rapid advancement of generative AI technology, it is being utilized across various fields, and systems and methods for quickly and easily creating digital content using this generative AI technology are also increasing rapidly.

For example, Korean Patent No. 10-2551004 is directed to a platform service system and method for digitalizing and trading user-generated content in a virtual reality created by modeling the real world using a Non-fungible token (NFT) approach. This system comprises a terminal for inputting and outputting content information for content creation, a device for collecting video data, a metaverse platform for creating and managing metaverse content, an NFT server applying blockchain encryption technology to encrypt and store user-generated content in a distributed manner, a content transaction server for settling NFT revenues, and a billing settlement server.

Furthermore, Korean Patent Application Publication No. 10-2021-0154786 is directed to a method and apparatus for providing digital content. This patent involves generating coupon information corresponding to digital content belonging to a first user terminal, conducting transactions of the digital content between the first user terminal and a second user terminal, and, upon completion of the transaction of digital content, providing at least one of the generated coupon information and digital content to the second user terminal.

In addition, Korean Patent Application Publication No. 10-2022-0020844 is directed to a method for distributing digital content usage rights certificates. This method involves using blocks on a tamper-proof blockchain to manage the issuance quantity of digital content usage rights certificates and to prevent the distribution of invalid digital content and usage rights certificates.

REFERENCES OF THE RELATED ART

Patent Documents

Korean Patent No.: 10-2551004 (registered on Jun. 29, 2023)

Korean Patent Application Publication No.: 10-2021-0154786 (published on Dec. 21, 2021)

Korean Patent Application Publication No.: 10-2022-0020844 (published on Feb. 21, 2022)

SUMMARY OF THE INVENTION

An object of the present invention is to provide a digital content distribution apparatus and method that can create digital content using generative AI, create a digital copyright of the created digital content, and distribute the digital content including the digital copyright.

In order to achieve the above object, one embodiment of the present invention includes a digital content creation module that creates digital content using generative AI. Moreover, one embodiment of the present invention includes a digital copyright creation module that creates a digital copyright of the created digital content. Furthermore, one embodiment of the present invention provides a digital content distribution management unit and method for distributing digital content including the digital copyright created by the digital copyright creation module.

According to the embodiments of the present invention, it is possible to create digital content using generative AI, create a digital copyright of the created digital content, and distribute the digital content including the digital copyright.

BRIEF DESCRIPTION OF THE DRAWINGS

The above and other features and advantages of the present invention will become more apparent by describing in detail exemplary embodiments thereof with reference to the attached drawings in which:

FIG. 6 illustrates another embodiment of creating digital content and then creating digital copyright information according to the present invention;

Figure 7:
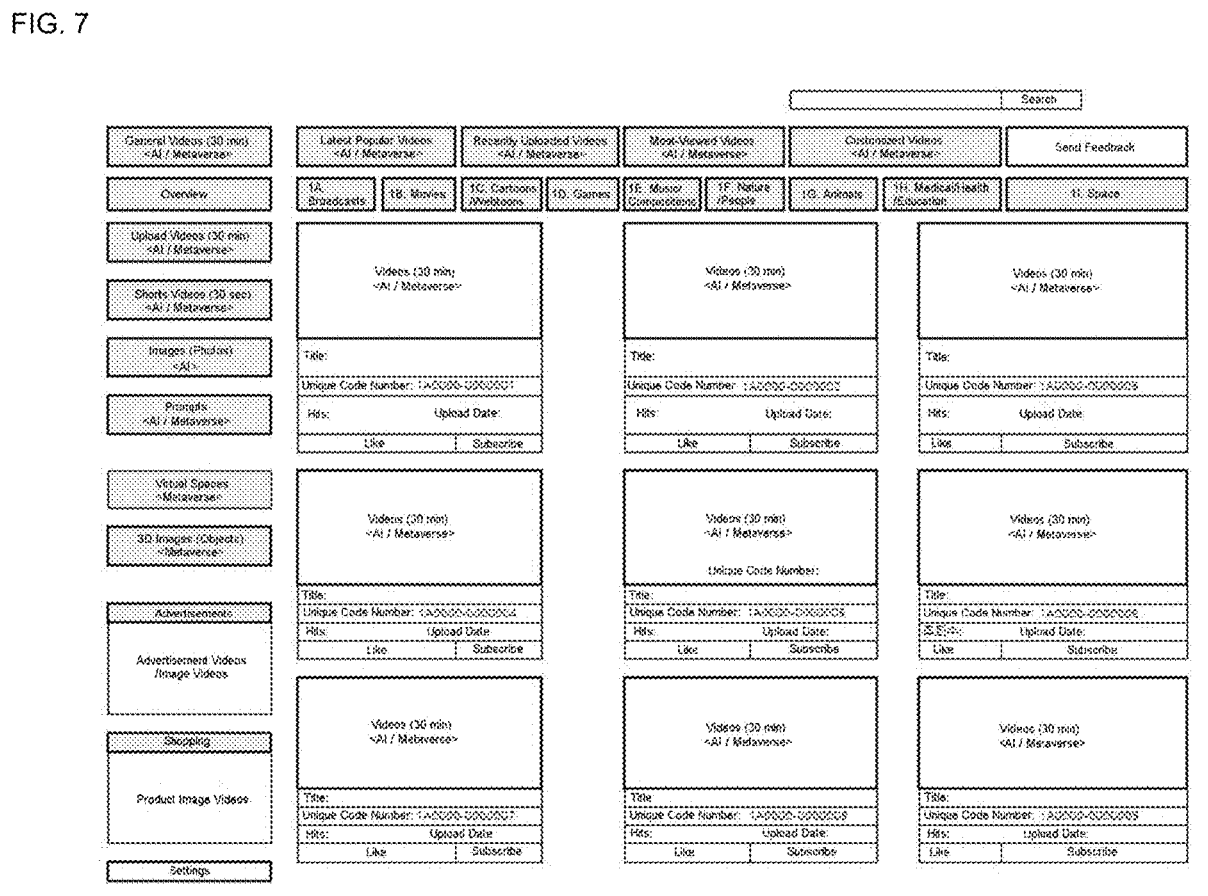

FIG. 7 illustrates an embodiment of video distribution according to the present invention;

DETAILED DESCRIPTION OF THE INVENTION

Hereinafter, preferred embodiments of the present invention will be described in detail with reference to the attached drawings.

Figure 1:
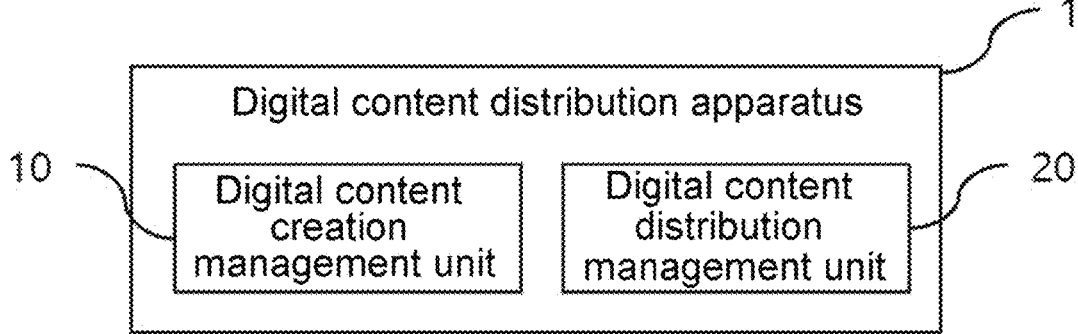
FIG. 1 is a schematic diagram of a digital content distribution apparatus according to the present invention, which illustrates the features of the digital content distribution apparatus of the present invention including a digital content creation management unit and a digital content distribution management unit.

FIG. 1 illustrates a schematic diagram of a digital content distribution apparatus 1 according to the present invention. The digital content distribution apparatus 1 of the present invention may include a digital content creation management unit 10 and a digital content distribution management unit 20. The digital content creation management unit 10 creates digital content, creates digital copyright information, and manages the created digital copyright information. The digital content distribution management unit 20 may include a created digital content sales module 210 and a settlement module 220.

Figure 2:
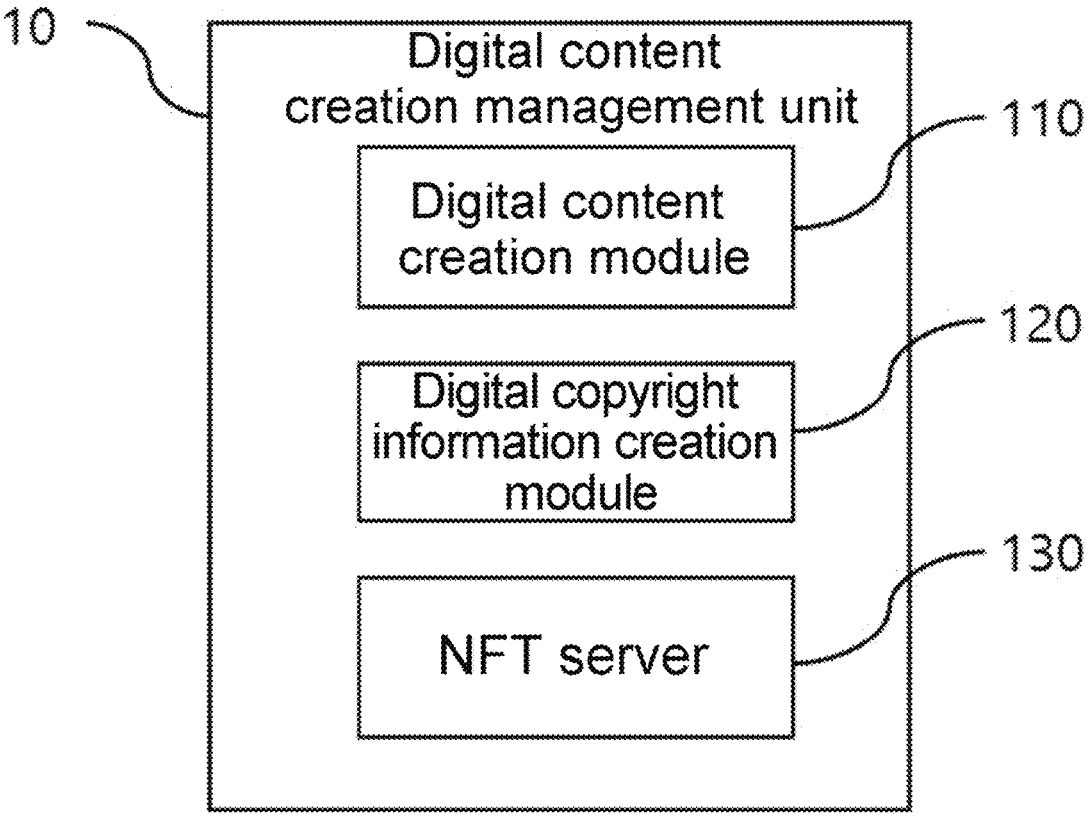
FIG. 2 illustrates a schematic diagram of a digital content creation management unit according to the present invention.

FIG. 2 illustrates a schematic diagram of a digital content creation management unit 10 according to the present invention. The digital content creation management unit 10 may include a digital content creation module 110, a digital copyright information creation module 120, and a non-fungible token (NFT) server 130.

The digital content creation module 110 may request generative AI to create digital content based on a keyword input by a user, and the digital copyright information creation module 120 may create digital copyright information and merge the created digital copyright information into the created digital content in an encrypted form. The generative AI may be a conventional generative AI, such as Midjourney, DALL-E, Dream Studio, Bing Image Creator, Adobe Firefly, Leonardo AI, NightCafe, Dream by Wombo, Deep Dream Generator, Studio D-ID, Starry AI, Jasper Art, Karlo AI, Lasco AI, etc.

Alternatively, the generative AI may be integrated in the digital content creation module 110. If the generative AI is integrated in the digital content creation module 110, the generative AI may be implemented using open-source technology.

The digital copyright information creation module 120 may include a list of the generative AIs, with each generative AI having a unique identifier in the list. The unique identifiers included in the list are not authorized unique identifiers, but may be uniquely defined for the purpose of the present invention.

The digital content creation module 110 may request the generative AI to create digital content based on information input by the user and receive the created digital content from the generative AI.

The digital copyright information creation module 120 may create digital copyright information based on the unique identifier of the generative AI stored in the list, the date and time of digital content creation, the user's name, and digital content information. The created digital copyright information may be encrypted and merged with the created digital content. In another embodiment, the digital copyright information creation module 120 may create digital copyright information based on the unique identifier of the generative AI stored in the list, the date and time of digital content creation, the user's name, digital content information, and an accredited certificate. The accredited certificate may be issued by organizations such as Korea Securities Computer Corporation, Korea Information Society Development Institute, Korea Information Certificate Authority, Korea Electronic Certification Authority, Korea Financial Telecommunications and Clearings Institute, Korea Trade Network Limited Company, etc.

Figure 3:
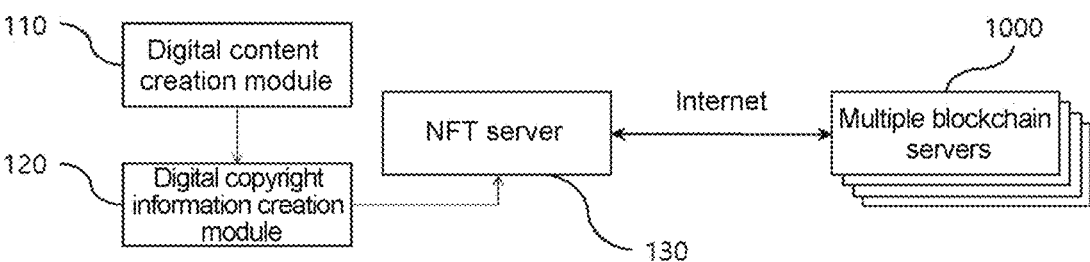
FIG. 3 illustrates a schematic diagram of a digital content creation module, a digital copyright information creation module, and an NFT server that is interconnected with a blockchain server.

FIG. 3 illustrates a schematic diagram of a digital content creation module 110, a digital copyright information creation module 120, and an NFT server 130 that is interconnected with a blockchain server according to the present invention. As described above, the digital content creation module creates digital content using generative AI, and the digital copyright information creation module 120 creates digital copyright information based on the unique identifier of the generative AI, the date and time of content creation, the user's name, and the content information, or based on the unique identifier of the generative AI, the date and time of content creation, the user's name, the content information, and the accredited certificate, encrypts the created digital copyright information and merges the encrypted digital copyright information with the already created digital content, and transmits the merged result to the NFT server 130. The NFT server 130 may encrypt the digital content including the digital copyright information and store the encrypted digital copyright information in the form of a blockchain across multiple blockchain servers 1000 in a distributed manner.

Figure 4:
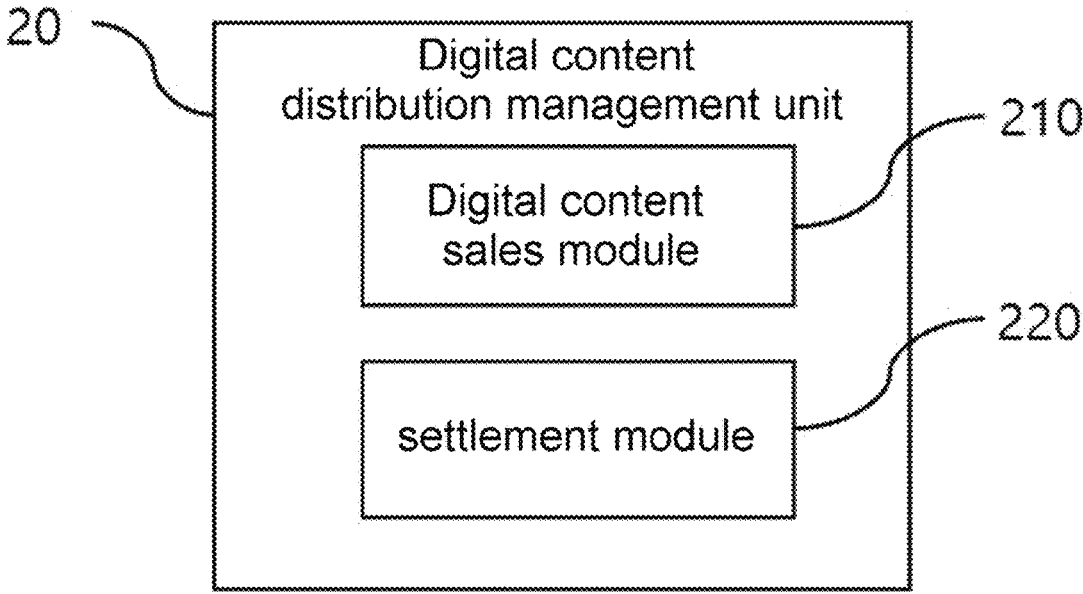
FIG. 4 illustrates a schematic diagram of a digital content distribution management unit according to the present invention.

FIG. 4 illustrates a schematic diagram of a digital content distribution management unit 20 according to the present invention. The digital content distribution management unit 20 may include a digital content sales module 210 and a settlement module 220. The digital content sales module 210 may include a UI for selling the digital content. The UI may include the type and characteristic of digital content to be sold. For example, the types of digital content may include broadcasts, movies, cartoons/webtoons, games, music/compositions, nature/people, animals, medical/health/education, space, cyborgs/aliens, nature/plants, cities/buildings, art/artists, and general photos. Moreover, the characteristics of digital content may include general videos, latest popular videos, recently uploaded videos, most-viewed videos, customized videos, shorts videos, images, latest popular images, recently uploaded images, most-viewed images, customized images, prompts, latest popular prompts, recently uploaded prompts, most-viewed prompts, customized prompts, virtual spaces, latest popular virtual spaces, recently uploaded virtual spaces, most-viewed virtual spaces, customized virtual spaces, 3D images, latest popular 3D images, recently uploaded 3D images, most-viewed 3D images, and customized 3D images.

The settlement module 220 is a module for settling transactions when digital content posted by a user is sold to a third party and may include a conventional payment system. The conventional payment system may include, for example, Inicis, KCP, alltheGate, KSPay, AllatBiz, Dacom BillGate, Teledit, Delec, Korea Securities Computer Corporation Payzone, Naver Pay, Toss Pay, Kakao Pay, etc.

Figure 5:
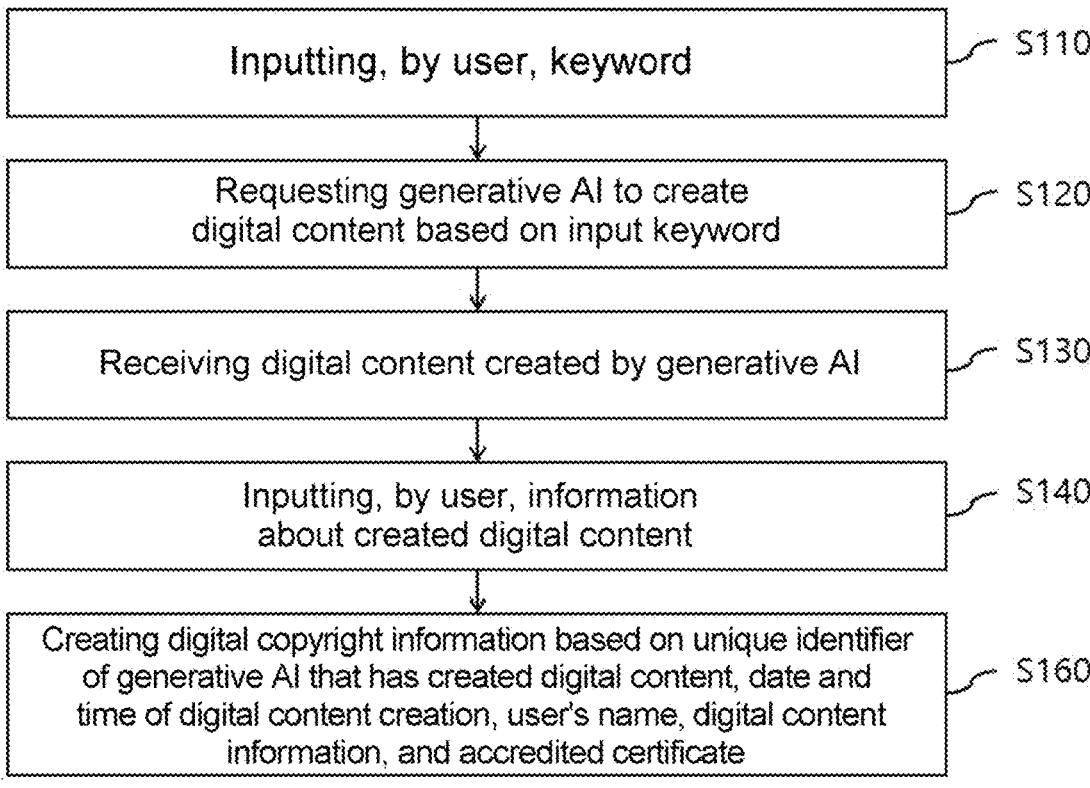
FIG. 5 illustrates an embodiment of creating digital content and then creating digital copyright information according to the present invention.
Figure 8:
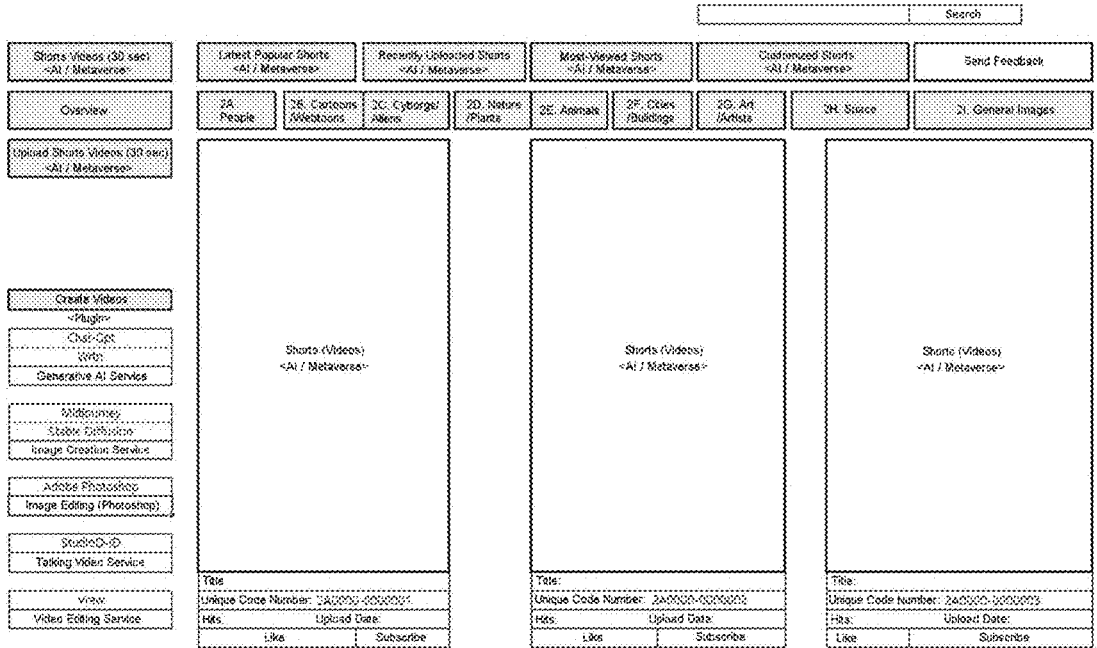
FIG. 8 illustrates an embodiment of shorts video distribution according to the present invention.
Figure 9:
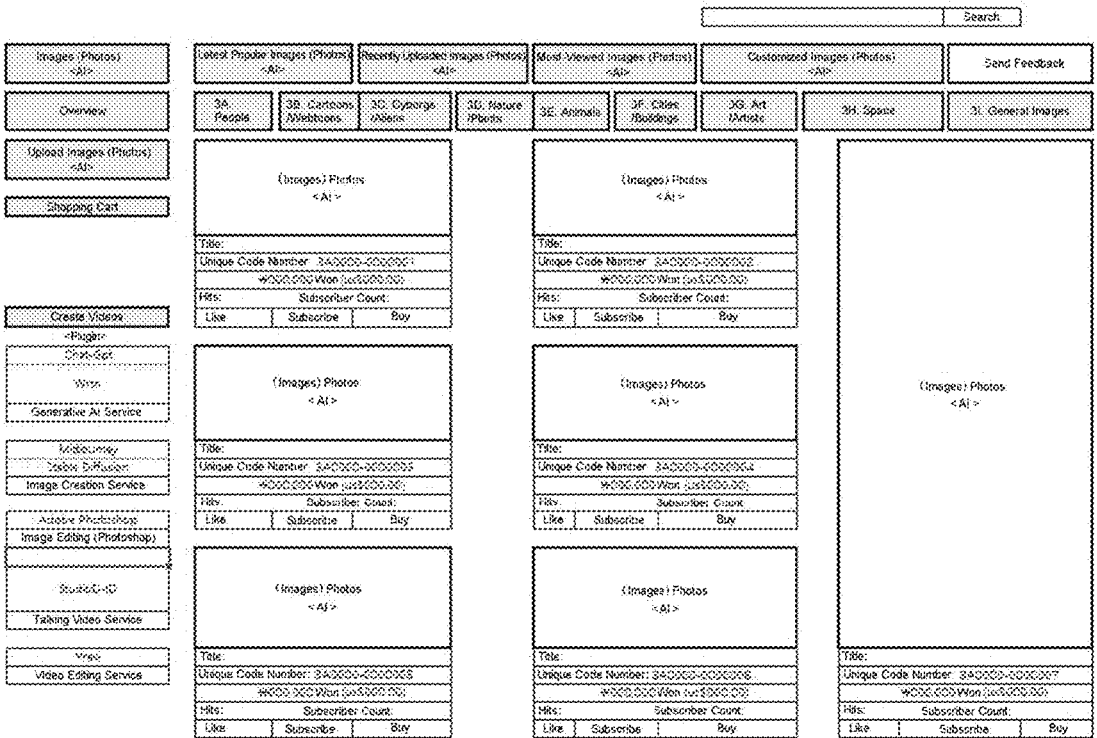
FIG. 9 illustrates an embodiment of photo (image) distribution according to the present invention.
Figure 10:
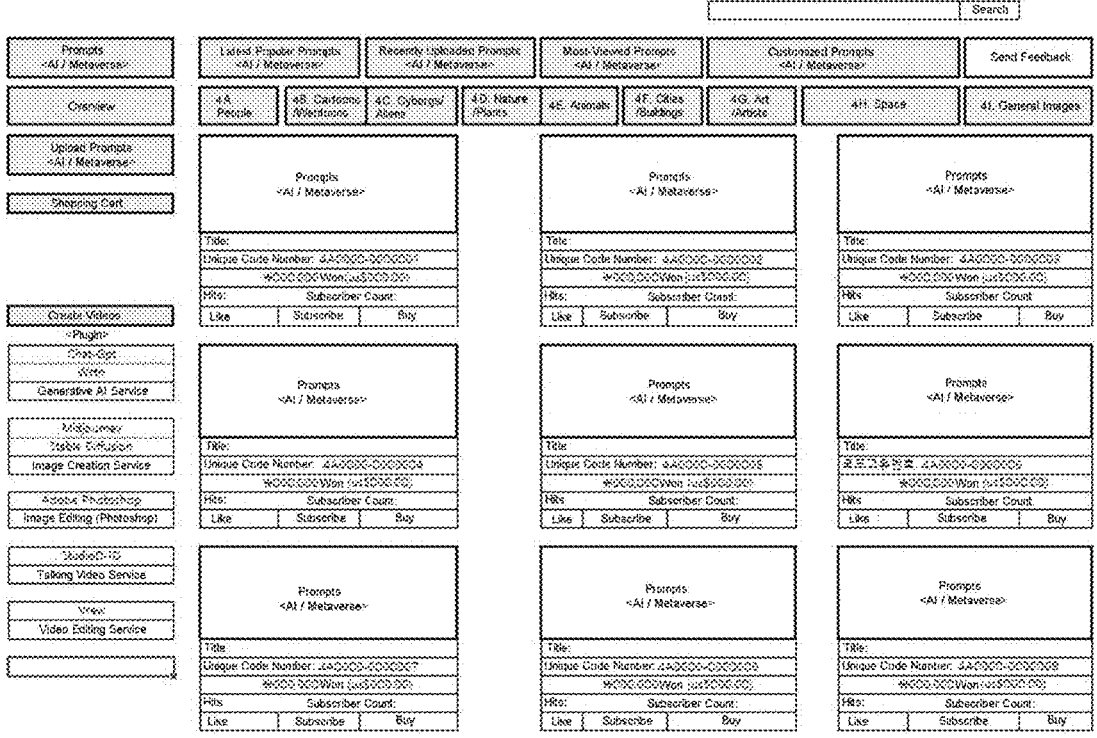
FIG. 10 illustrates an embodiment of prompt distribution according to the present invention.
Figure 11:
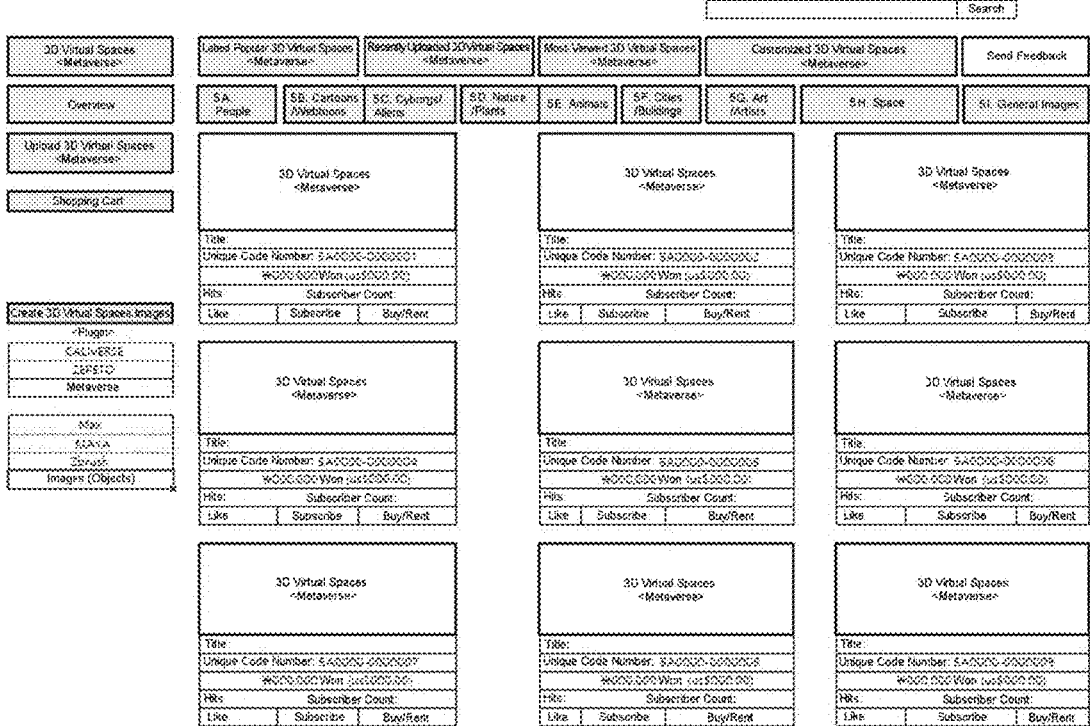
FIG. 11 illustrates an embodiment of virtual space distribution according to the present invention.
Figure 12:
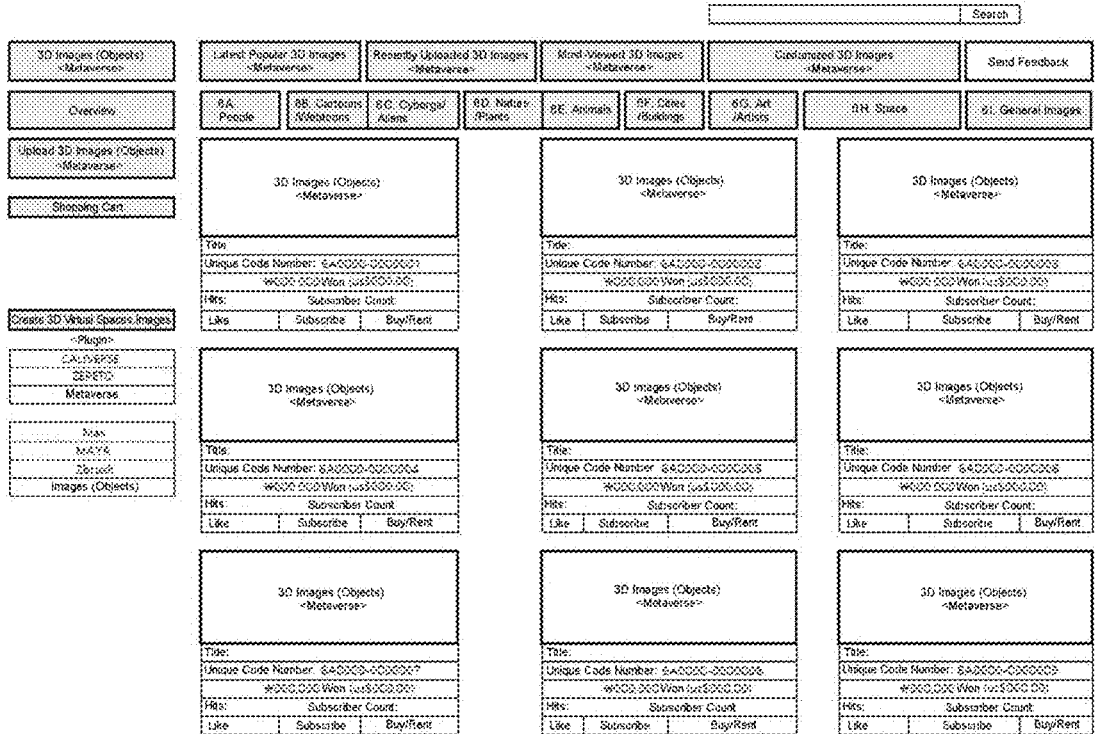
FIG. 12 illustrates an embodiment of 3D image distribution according to the present invention.

FIG. 5 illustrates an embodiment of creating digital content and then creating digital copyright information according to the present invention;

The step of creating digital content may include the steps of: inputting, by a user, a keyword; requesting the generative AI to create digital content based on the input keyword; and receiving the digital content created by the generative AI, wherein the user may be a user who wishes to create and sell the digital content.

The step of creating digital copyright information may include the steps of: inputting, by the user, information about the created digital content; and creating digital copyright information based on the unique identifier of the generative AI that has created the digital content, the date and time of content creation, the user's name, and the content information.

As illustrated in FIG. 6, alternatively, the step of creating the digital copyright information may include the steps of: inputting, by a user, information about the created digital content; requesting and receiving an accredited certificate from an external certification authority; and creating digital copyright information based on the unique identifier of the generative AI that has created the digital content, the date and time of digital content creation, the user's name, digital content information, and the accredited certificate.

FIGS. 7 to 12 each illustrate an embodiment of video distribution, shorts video distribution, photo (image) distribution, prompt distribution, virtual space distribution, and 3D image distribution according to the present invention.

BRIEF DESCRIPTION OF REFERENCE NUMERALS

1: digital content distribution apparatus
10: digital content creation management unit
20: digital content distribution management unit
110: digital content creation module
120: digital copyright information creation module
130: NFT server
1000: multiple blockchain servers

What is claimed is:
1. A digital content distribution apparatus comprising:
a digital content creation management unit including:
    a digital content creation module which creates digital content,
    a digital copyright information creation module, and
    a non-fungible token (NFT) server; and
a digital content distribution management unit including a created digital content sales module and a settlement module,
wherein:
the digital copyright information creation module creates digital copyright information based on:
    digital content information associated with the digital content; and
    a unique identifier of generative AI stored in a list included in the digital copyright information creation module,
the digital copyright information creation module transmits the digital content merged with the digital copyright information to the NFT server,
the NFT server encrypts the digital content including the digital copyright information, and
the NFT server stores the encrypted digital copyright information in a form of a blockchain across multiple blockchain servers in a distributed manner.
2. The digital content distribution apparatus according to claim 1, wherein the digital content creation module requests generative AI to create digital content based on a keyword input by a user and receives the created digital content from the generative AI.
3. The digital content distribution apparatus according to claim 1, wherein the digital copyright information creation module creates the digital copyright information further based on a date and time of digital content creation and a user's name.
4. The digital content distribution apparatus according to claim 1, wherein the digital copyright information creation module creates the digital copyright information further based on a date and time of digital content creation, a user's name, and an accredited certificate.
5. The digital content distribution apparatus according to claim 3 or 4, wherein the digital copyright information is encrypted and merged with the digital content.
6. The digital content distribution apparatus according to claim 1, wherein the digital content sales module includes a UI for selling the digital content.
7. The digital content distribution apparatus according to claim 6, wherein the UI includes a type and characteristic of digital content to be sold.
8. The digital content distribution apparatus according to claim 1, wherein the settlement module settles transactions when digital content posted by a user is sold to a third party.
9. A digital content distribution method comprising steps of:
    inputting, by a user, a keyword;
    requesting generative AI to create digital content based on the input keyword;
    receiving the digital content created by the generative AI;
    inputting, by the user, information about the created digital content;
    creating digital copyright information based on a unique identifier of the generative AI that has created the digital content, a date and time of digital content creation, a user's name, and digital content information;
    transmitting the digital content merged with the digital copyright information to a non-fungible token (NFT) server;
    encrypting, at the NFT server, the digital content including the digital copyright information; and
    storing, at the NFT server, the encrypted digital copyright information in a form of a blockchain across multiple blockchain servers in a distributed manner.
10. A digital content distribution method comprising steps of:
    inputting, by a user, a keyword;
    requesting generative AI to create digital content based on the input keyword;
    receiving the digital content created by the generative AI;
    inputting, by the user, information about the created digital content;
    requesting an accredited certificate from an external certification authority;
    creating digital copyright information based on a unique identifier of the generative AI that has created the digital content, a date and time of digital content creation, a user's name, digital content information, and the accredited certificate;
    transmitting the digital content merged with the digital copyright information to a non-fungible token (NFT) server;
    encrypting, at the NFT server, the digital content including the digital copyright information; and
    storing, at the NFT server, the encrypted digital copyright information in a form of a blockchain across multiple blockchain servers in a distributed manner.
11. The digital content distribution method according to claim 9 or 10, further comprising a step of:
    merging the encrypted digital copyright information with the created digital content.
12. The digital content distribution method according to claim 11, further comprising a step of:
    transmits the digital content merged with the digital copyright information to the NFT server.

13. The digital content distribution method according to claim 12, further comprising a step of:

inputting, by the user, a type and a characteristic of digital content for a purpose of selling the digital content.

14. The digital content distribution method according to claim 13, further comprising a step of:

settling transactions when digital content posted by the user is sold to a third party.

\* \* \* \* \*